United States Patent
Sano et al.

(10) Patent No.: US 12,110,346 B2
(45) Date of Patent: Oct. 8, 2024

(54) METHOD OF PRODUCING PHOSPHORIC ACID CROSSLINKED STARCH

(71) Applicant: OJI HOLDINGS CORPORATION, Tokyo (JP)

(72) Inventors: Fumihiko Sano, Tokyo (JP); Kazuya Ikeshima, Tokyo (JP); Akiko Asano, Tokyo (JP); Akiko Tamagawa, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 879 days.

(21) Appl. No.: 17/251,067

(22) PCT Filed: Jun. 14, 2019

(86) PCT No.: PCT/JP2019/023685
§ 371 (c)(1),
(2) Date: Dec. 10, 2020

(87) PCT Pub. No.: WO2019/240267
PCT Pub. Date: Dec. 19, 2019

(65) Prior Publication Data
US 2021/0246230 A1 Aug. 12, 2021

(30) Foreign Application Priority Data
Jun. 15, 2018 (JP) ................ 2018-114168

(51) Int. Cl.
*C08B 31/00* (2006.01)
*A23L 29/219* (2016.01)
*A23L 33/125* (2016.01)

(52) U.S. Cl.
CPC .......... *C08B 31/003* (2013.01); *A23L 29/219* (2016.08); *A23L 33/125* (2016.08); *A23V 2002/00* (2013.01)

(58) Field of Classification Search
CPC .... C08B 31/003; A23L 33/125; A23L 29/219; A23V 2002/00
See application file for complete search history.

(56) References Cited

FOREIGN PATENT DOCUMENTS

| | | |
|---|---|---|
| CN | 101935355 A | 1/2011 |
| JP | 49-118783 A | 11/1974 |
| JP | 4532603 B2 | 8/2010 |
| JP | 2017-145348 A | 8/2017 |

OTHER PUBLICATIONS

Hegenbart, Understanding starch functionality, internet article, Jan. 1996, https://www.naturalproductsinsider.com/formulation/understanding-starch-functionality. (Year: 1996).*
International search report dated Sep. 17, 2019 in International Application No. PCT/JP2019/023685.
Written Opinion of the International Searching Authority dated Sep. 17, 2019 in International Application No. PCT/JP2019/023685.
International Preliminary Report on Patentability dated Dec. 15, 2020 in International Application No. PCT/JP2019/023685.
Shi et al., "Preparation, physicochemical properties, and in vitro digestibility of cross-linked resistant starch from pea starch", Starch, 2013, vol. 65, pp. 947-953 (4 pages total).
Woo et al., "Cross-Linked Resistant Starch: Preparation and Properties", Cereal Chem., 2002, vol. 79, No. 6, pp. 819-825 (7 pages total).
Comer et al., "Purification, Modification, and Properties of Air-Classified Pea Starch", Cereal Chem., 1978, vol. 55, No. 6, pp. 818-829 (12 pages total).
Carmona-Garcia et al., "Effect of the cross-linked reagent type on some morphological, physicochemical and functional characteristics of banana starch (*Musa paradisiaca*)", Carbohydrate Polymers, 2009, vol. 76, pp. 117-122 (6 pages total).
Huber et al., "Location of Sites Reaction Within Starch Granules", Cereal Chem., 2001, vol. 78, No. 2, pp. 173-180 (8 pages total).
Sui et al., "Relationship of the channels of normal maize starch to the properties of its modified products", Carbohydrate Polymers, 2013, vol. 92, pp. 894-904 (11 pages total).
Kurasawa, "Transition of definition and determination method of dietary fiber", Journal of Japanese Association for Dietary Fiber Research, 2007, Vo. 11, No. 1, pp. 1-14 (14 pages total).

* cited by examiner

*Primary Examiner* — Layla D Berry
(74) *Attorney, Agent, or Firm* — Sughrue Mion, PLLC

(57) ABSTRACT

The present invention provides a method of producing phosphoric acid crosslinked starch, including adding phosphorus oxychloride sequentially to raw starch slurry under a condition of pH 9 to 12 to cause the raw starch to undergo a phosphoric acid crosslinking reaction, and controlling the pH by sequentially adding an alkaline solution, wherein concentration of the alkaline solution is increased stepwise or continuously between start and end of the phosphoric acid crosslinking reaction. By the production method of the present invention, phosphoric acid crosslinked starch having a low phosphorus content and a high resistant starch content (for example, pea-derived phosphoric acid crosslinked starch, which has a resistant starch content of 80% or more according to a resistant starch measurement method of AOAC official method 2002.02 and a phosphorus content of 0.5% or less) can be obtained.

14 Claims, No Drawings

METHOD OF PRODUCING PHOSPHORIC ACID CROSSLINKED STARCH

CROSS-REFERENCE TO RELATED APPLICATIONS

This application is a National Stage of International Application No. PCT/JP2019/023685 filed Jun. 14, 2019, which claims priority under U.S.C. § 119(a) to Japanese Patent Application No. JP 2018-114168 filed on Jun. 15, 2018.

TECHNICAL FIELD

The present invention relates to a method of producing phosphoric acid crosslinked starch.

BACKGROUND ART

Resistant starch (RS) is an amylase-resistant indigestible starch, and has various physiological effects such as an effect of improving insulin responsiveness, improving intestinal function, and improving symptoms associated with fat in the blood, as dietary fiber has. Resistant starch is classified into 4 types of RS1 to RS4. RS1 is starch that is insusceptible to the effect of digestive enzymes as being physically surrounded by hard tissues (such as millet). RS2 is starch in which starch itself is insusceptible to the effect of digestive enzymes. RS3 is senescent starch, and RS4 is a chemically modified starch.

Phosphoric acid crosslinked starch is known as one of the RS4 type starch. Depending on the phosphoric acid crosslinking in starch, swelling (gelatinization) is suppressed, and starch can be insusceptible to the effect by amylase. Patent Documents 1 and 2 and Non-Patent Document 1 disclose methods for obtaining phosphoric acid crosslinked starch by reacting raw starch with sodium trimetaphosphate.

CITATION LIST

Patent Documents

Patent Document 1: JP-B-4532603
Patent Document 2: JP-A-2017-145348

Non-Patent Documents

Non-Patent Document 1: Starch 2013, 65, 947-953

SUMMARY OF THE INVENTION

Phosphoric acid crosslinked starch, which is a food additive, needs to have phosphorus content that meets the food additive standard. In addition, with the increase in the use of processed foods at present, there are increasing opportunities to consume various phosphates used as food additives. Consequently, overconsumption of phosphate has become an issue, and phosphoric acid crosslinked starch with low phosphorus content is desired. It is an object of the present invention to provide a method of producing phosphoric acid crosslinked starch by which phosphoric acid crosslinked starch having a high resistant starch content at a low phosphorus content can be obtained.

In order to solve the above problems, the inventors of the present invention have studied various phosphoric-acid-crosslinking agents and conditions, and have found that by using phosphorus oxychloride as the phosphoric-acid-crosslinking agent, phosphoric acid crosslinked starch having a high resistant starch content can be obtained at a low phosphorus content. Based on these findings, the inventors of the present invention have conducted further studies and completed the present invention.

Specifically, the present invention provides the following [1] to [12].

[1] A method of producing phosphoric acid crosslinked starch, comprising:
adding phosphorus oxychloride sequentially to raw starch slurry under a condition of pH 9 to 12, to cause the raw starch to undergo a phosphoric acid crosslinking reaction, and
controlling the pH by sequentially adding an alkaline solution,
wherein concentration of the alkaline solution is increased stepwise or continuously between start and end of the phosphoric acid crosslinking reaction.

[2] The production method according to [1], wherein the alkaline solution is an aqueous NaOH solution or an aqueous KOH solution.

[3] The production method according to [1] or [2], wherein concentration of the raw starch in the raw starch slurry is 30% by mass or more, total mass of the phosphorus oxychloride added is 12% by mass or more based on dry mass of the raw starch, and concentration of the starch in the reaction liquid at the end of the reaction is 15% by mass or more.

[4] The production method according to [3], wherein the total mass of the phosphorus oxychloride added is 14 to 20% by mass based on the dry mass of the raw starch.

[5] The production method according to [3] or [4], wherein ratio of mass of the reaction liquid at the end of the reaction to mass of the raw starch slurry is 2.5 or less.

[6] The production method according to any one of [3] to [5], wherein the alkaline solution is an aqueous NaOH solution, the concentration of the raw starch in the raw starch slurry is 30 to 45% by mass, and concentration of the aqueous NaOH solution is increased from 2 to 4% by mass to 11 to 20% by mass from the start of the reaction to the end of the reaction.

[7] The production method according to [6], wherein the aqueous NaOH solution comprises 2 types including a solution having a concentration of 2 to 4% by mass and a solution having a concentration of 11 to 13% by mass.

[8] The production method according to any one of [1] to [7], wherein a resistant starch content according to a resistant starch measuring method of AOAC official method 2002.02 of the raw starch is 20% or less.

[9] The production method according to any one of [1] to [8], wherein an amylose content of the raw starch is less than 40% by mass.

[10] The production method according to any one of [1] to [9], wherein the raw starch is pea starch.

[11] The production method according to any one of [1] to [10], wherein a resistant starch content of the phosphoric acid crosslinked starch according to a resistant starch measurement method of AOAC official method 2002.02 is 60% or more.

[12] Phosphoric acid crosslinked starch derived from pea, which has a resistant starch content of 80% or more according to a resistant starch measurement method of AOAC official method 2002.02 and a phosphorus content of 0.5% or less.

A method of producing phosphoric acid crosslinked starch is provided by the production method of the present invention, phosphoric acid crosslinked starch having a high resistant starch content can be obtained at a low phosphorus content. For example, by the production method of the present invention, even when raw starch having a low amylose content is used, phosphoric acid crosslinked starch having a phosphorus content of 0.5% or less and a resistant starch content of 80% or more can be obtained by a simple procedure.

MODE FOR CARRYING OUT THE INVENTION

Hereinafter, the present invention will be described in detail. Although the explanation of the constituent features described below may be made based on representative embodiments and specific examples, the present invention is not limited to such embodiments.
<Method of Producing Phosphoric Acid Crosslinked Starch>

The method of producing phosphoric acid crosslinked starch of the present invention comprises subjecting a raw starch to a phosphoric acid crosslinking reaction. Specifically, the production method of phosphoric acid crosslinked starch of the present invention includes sequentially adding phosphorus oxychloride to raw starch slurry to cause the raw starch to undergo a phosphoric acid crosslinking reaction, and at this time, the concentration of the alkaline solution added for pH control is increased stepwise or continuously between the start and the end of the reaction.
(Material Starch)

There is no particular limitation on the raw starch in the production method of the present invention. The raw starch may or may not already have a phosphoric acid cross-linking, but it is preferable that the raw starch does not have a phosphoric acid cross-linking. In other words, it is preferable that the raw starch is starch which has not been subjected to a phosphoric acid crosslinking treatment. The phosphorus content of the raw starch is preferably 0.15% or less, more preferably 0.09% or less, and still more preferably 0.03% or less. In the specification, phosphorus content means a value measured as described in the examples in the specification according to "Acetylated phosphoric acid crosslinked starch purity test (3)" on page 383 of the 9th edition of the Japan's specifications and standards for food additives.

As the raw starch, starch isolated and purified from a plant may be used as it is, or starch isolated and purified from a plant may be further subjected to a chemical treatment (e.g., an acid treatment described later). It is preferable to use starch isolated and purified from a plant as it is from the viewpoint of good yield of the raw starch and from the viewpoint of not affecting the molecular weight of phosphoric acid crosslinked starch produced.

By the production method of the present invention, even if the resistant starch content in the raw starch is low, phosphoric acid crosslinked starch having a high resistant starch content can be obtained. For example, the raw starch may have a resistant starch content of 20% or less.

As used in the specification, "resistant starch content" means the resistant starch content according to the resistant starch measuring method of AOAC Official Method 2002.02.

As a quantitation method related to the resistant starch measuring method, the enzyme-weight method (AOAC985.29: Proski method) of AOAC (the Association of the Official Analytical Chemists) has conventionally been used as the main official quantitation method of dietary fiber. However, it is known that the resistant starch measuring method of AOAC official method 2002.02 is highly correlated with the results in vivo, as being a method in which digestion is conducted under a condition in more conformity with digestion in vivo compared to the resistant starch measuring method based on the Proski method. In addition, various methods are used as the resistant starch measurement method in accordance with types or the like of resistant starch. Table 1 shows the results of a plurality of measurements performed on the same phosphoric acid crosslinked starch by the inventors of the present invention.

TABLE 1

|  | AOAC 2002.02 | AOAC 2009 | AOAC 985-29: (enzyme-weight method) |
|---|---|---|---|
| Phosphorus oxychloride is used at 16% with respect to starch weight | 73.6% | 91.7% | 96.3% |
| Sodium trimetaphosphate is used at 12% with respect to starch weight | 35.6% | 39.7% | 90.4% |

From the results shown in Table 1, it can be understood that a lower resistant starch content value tends to be obtained by AOAC official method 2002.02. In the production method of the present invention, phosphoric acid crosslinked starch having a resistant starch content of 60% or more, particularly 80% or more, even in accordance with the resistant starch measuring method of this AOAC official method 2002.02, can be obtained.

Generally, starch with high amylose content has high resistant starch content. According to the production method of the present invention, even when the raw starch is not high amylose starch (starch having a high amylose content), phosphoric acid crosslinked starch having a high resistant starch content can be obtained. For example, the amylose content of the raw starch may be less than 50% by mass, less than 40% by mass, or less than or equal to 35% by mass. In the specification, amylose content means the amylose content as measured by the "Method Using Amylose Precipitating Agents" described on page 50 of Starch Handbook (edited by Ziro NIKUNI, Asakura Shoten). According to the description in this document, amylose content is 26-28% by mass for corn starch, 20-21% by mass for tapioca starch, and 34.5% by mass for pea starch.

Specific examples of the raw starch include rice starch, wheat starch, corn starch, potato starch, tapioca starch, green bean starch, and pea starch. Among these, pea starch (Pea Starch) is particularly preferably used. As described in Non-Patent Document 1, pea starch is a by-product when protein is extracted from peas, and is available at a lower cost than other starch species. In addition, pea starch as it is has a whiter color compared with other starch species, and has almost no peculiar odor such as grain odor of corn starch, and has an advantage that it does not impair color and flavor of food when used in the food.

Although there is no particular limitation on the molecular weight of the raw starch, it is preferable that the molecular weight of the raw starch is larger, because resistant starch (phosphoric acid crosslinked starch) having a larger molecular weight is less susceptible to fermentation by enterobacteria after ingestion than resistant starch having a smaller molecular weight. Specifically, the molecular weight of the raw starch may be $5.0 \times 10^3$ or more, and is preferably $8.0 \times 10^3$ or more in terms of weight average molecular weight (Mw). The upper limit of the molecular weight (weight average molecular weight) of the raw starch is not particularly limited, but may be $1.0 \times 10^8$ or less. The weight average molecular weight (Mw) is a value measured by GPC (gel permeation chromatography).

As the raw starch, hydrolyzed starch obtained by subjecting starch derived from various raw materials to acid treatment by a known method, which is chemically processed starch, can also be used. In this case, the weight average molecular weight (Mw) of the raw starch after the acid treatment is preferably $1.0 \times 10^4$ or less. By using an acid-treated material as the raw starch, a soluble component contained in the raw starch can be removed, so that the amount of phosphorus oxychloride added can be reduced. Thus, the phosphorus content of the resulting phosphoric acid crosslinked starch can be further reduced.

(Starch Slurry)

"Starch slurry" in the specification means either or both of raw starch slurry and reaction liquid during the reaction comprising starch and phosphorus oxychloride. In addition, in the specification, "starch" may be used in the meaning including both the raw starch and the produced phosphoric acid crosslinked starch The raw starch slurry is a liquid obtained by dissolving or suspending raw starch in water. In the specification, "raw starch slurry" means slurry containing raw starch and water prior to the addition of phosphorus oxychloride. Note that the raw starch slurry may be made of only raw starch and water, or may contain other components. For example, in addition to the raw starch and water, the raw starch slurry may contain a metal salt such as sodium sulfate. Sodium sulfate can function as a component having an action of suppressing gelatinization of starch in starch slurry.

It is preferable that the starch concentration of the raw starch slurry is the highest concentration within a range in which the raw starch slurry can be stirred. In the production method of the present invention, it is preferable to prepare the raw starch slurry which has the highest concentration within a range capable of being stirred according to the performance of the reaction system and the agitator to be used. For example, the starch concentration of the raw starch slurry may be 30% by mass or more, preferably more than 35% by mass, and more preferably more than 40% by mass. The starch concentration of the raw starch slurry may be 45% by mass or less, preferably 43% by mass or less, and more preferably 40% by mass or more and 42% by mass or less. The starch concentration of the raw starch slurry may be, for example, more than 35% by mass and not more than 45% by mass.

It is preferable that the raw starch slurry is adjusted to pH 9 to 12 by adding an alkaline solution in advance prior to the addition of phosphorus oxychloride in the phosphoric acid crosslinking reaction described below. After adjusting to pH 9 to 12, it is preferable to provide a step of stirring only the raw starch slurry for an additional 10 minutes to 1 hours, preferably about 30 minutes. The alkaline solution to be added at this time may have a concentration of an alkaline solution to be added at the start of the phosphoric acid crosslinking reaction described below. The amount of the alkaline solution added, as described in the examples and the like in the specification, is an amount containing the amount of alkaline solution added prior to the addition of phosphorus oxychloride. In addition, in the specification, when concentration of the starch in the raw starch slurry is described, it means the concentration of the starch in the raw starch slurry before such an alkaline solution is added.

In the production method of the present invention, an alkaline solution is added to the starch slurry during the progress of the phosphoric acid crosslinking reaction. Therefore, concentration of the starch in the starch slurry is reduced by the phosphoric acid crosslinking reaction. When the concentration of the starch in the raw starch slurry is 30% by mass or more, the concentration of the starch in the starch slurry at the end of the phosphoric acid crosslinking reaction is preferably 15% by mass or more, more preferably 16% by mass or more, and still more preferably 17% by mass or more. At this time, the amount of phosphorus oxychloride to be added (total mass added) described later is preferably 12% by mass or more based on the mass of the raw starch used (dry mass). By suppressing the decrease in the concentration of the starch in the starch slurry within the above range, a decrease in the phosphoric acid crosslinking reaction efficiency is prevented, and starch having a higher resistant starch content can be obtained. Here, the end of the phosphoric acid crosslinking reaction means a time point at which all of phosphorus oxychloride and alkaline solution are added, and typically, the reaction liquid at the end of the phosphoric acid crosslinking reaction may be starch slurry immediately before an acidic solution is added for neutralization of the slurry after the phosphoric acid crosslinking reaction.

Further, the ratio of the mass of the starch slurry at the end of the reaction to the mass of the raw starch slurry (the mass before the alkaline solution is added) is preferably 3.0 or less, more preferably 2.7 or less, still more preferably 2.5 or less, and particularly preferably 2.4 or less. This is because, by suppressing an increase of the starch slurry mass within the above range, a decrease in the concentration of the starch in the starch slurry is suppressed, and a decrease in the phosphoric acid crosslinking reaction efficiency is prevented, so that starch having a higher resistant starch content can be obtained. The lower limit value of the ratio of the starch slurry mass at the end of the reaction to the raw starch slurry mass is not particularly limited, but is usually 2.0 or more.

During the phosphoric acid crosslinking reaction, the starch slurry is preferably stirred. That is for maintaining a uniform component concentration and pH in the entire starch slurry in a container.

The temperature of the starch slurry during the phosphoric acid crosslinking reaction may be 20° C. to 40° C., preferably 30° C. to 37° C., more preferably about 35° C.

(Phosphorus Oxychloride)

In the production method of the present invention, phosphorus oxychloride is used as a phosphoric acid-crosslinking agent. As shown in the examples described later, the inventors of the present invention have found that starch having an equivalent resistant starch content can be obtained at a lower phosphorus content in a production method using phosphorus oxychloride than a production method using trimetaphosphoric acid for phosphorylation.

The phosphoric acid crosslinking reaction in the production method of the present invention in which phosphorus oxychloride is used is carried out under a condition of pH 9 to 12. The phosphoric acid crosslinking reaction is preferably carried out under the conditions of pH 10 to 12, and more preferably under the conditions of about pH 11. In the specification, when the reaction is performed under a condition of a predetermined pH, it is meant that the reaction liquid of the phosphoric acid crosslinking reaction (the reaction liquid containing starch and phosphorus oxychloride during the reaction) is set to the above predetermined pH. At this time, it is preferable that the raw starch slurry at the start of the reaction also has the above predetermined pH.

Phosphorus oxychloride acts on hydroxyl groups of sugar chains present in starch to phosphorylate and cross-link the starch. As hydrogen chloride (HCl) is formed in that reaction, an alkaline solution is added sequentially during the reaction to maintain the conditions of pH 9 to 12.

The total mass of phosphorus oxychloride added is preferably 12% by mass or more, more preferably 14% by mass or more, and still more preferably 15% by mass or more, based on the dry mass of the raw starch. By using 12% by mass or more of phosphorus oxychloride, phosphoric acid crosslinked starch having a high degree of phosphoric acid crosslinking and a high resistant starch content can be obtained. On the other hand, the total mass of phosphorus oxychloride added is preferably 20% by mass or less, more preferably 18% by mass or less, based on the dry mass of the raw starch. By using 20% by mass or less of phosphorus oxychloride, the phosphorus content of the obtained phosphoric acid crosslinked starch can be suppressed. The total mass of phosphorus oxychloride added is particularly preferably 15 to 18% by mass based on the dry mass of the raw starch.

Phosphorus oxychloride, which is liquid at ordinary temperature, may be added to the starch slurry as it is.

Phosphorus oxychloride is added sequentially to the starch slurry. A rapid decrease in pH due to the generation of HCl can be suppressed by the sequential addition.

In the specification, a sequential addition means an addition over a period of time little by little instead of an addition at a time. The sequential addition may be a continuous addition in which the addition is continuous or an intermittent addition in which the addition is divided in a plurality of times. The sequential addition of phosphorus oxychloride may be a continuous addition or an intermittent addition, provided that the rapid decrease in the pH of the starch slurry can be suppressed. The addition rate, the amount of each addition, and the addition interval are not particularly limited. The time for the sequential addition of phosphorus oxychloride varies corresponding to the raw starch mass or the raw starch slurry mass, but may be added, for example, from 30 minutes to 3 hours, preferably from 1 hour to 2 hours.

(Alkaline Solution)

As described above, in the production method of the present invention, an alkaline solution is sequentially added to the starch slurry in order to carry out the reaction under the conditions of pH 9 to 12

The sequential addition of the alkaline solution may be a continuous addition or an intermittent addition, provided that the pH of the starch slurry can be maintained. The sequential addition of the alkaline solution may be conducted to maintain the condition of pH 9 to 12 in response to changes in pH of the starch slurry due to the sequential addition of phosphorus oxychloride. The amount added, the addition interval or the addition rate for each one addition of the sequential addition of the alkaline solution can be adjusted each time within a range in which the desired pH condition can be maintained. For example, the amount added per 1 minutes can be selected in a range of 0.5% by mass to 2% by mass based on the mass of the raw starch slurry. In addition, when the alkaline solution is added sequentially, for example, a device may be used in which the pump is automatically activated to perform an addition of an alkaline solution when pH of the slurry, which is measured as needed, is out of a predetermined pH condition (when pH of the slurry is likely to be less than pH 9). The amount of phosphorus oxychloride added can instead be adjusted, while maintaining the amount of each addition, the addition interval or the addition rate of the alkaline solution to be sequentially added to be constant from the start of the reaction to the end of the reaction, in the range in which the desired pH condition can be maintained. At this time, when the slurry pH, which is measured as needed, is out of the predetermined pH condition (when pH of the slurry is likely to exceed pH 12), phosphorus oxychloride may be added or the amount of phosphorus oxychloride added may be increased.

The total amount of the alkaline solution to be added may be any amount necessary for maintaining the pH of the starch slurry in the above range.

In the method of the present invention, the concentration of the alkaline solution to be added is increased during the reaction progress. As shown in the examples described below, the inventors of the present invention have found that, by increasing the concentration of the alkaline solution during the reaction progress, the resistant starch content in the obtained starch increases dramatically even when the amount of phosphorus oxychloride added to the raw starch is the same. The concentration of the alkaline solution may be increased stepwise or continuously between the start and the end of the reaction of the phosphoric acid crosslinking reaction. It is preferable that the concentration of the alkaline solution to be added is increased stepwise or continuously between the start and the completion of the addition of phosphorus oxychloride to the starch slurry.

It is considered that, by increasing the concentration of the alkaline solution to be added during the reaction, not only gelatinization of the starch can be prevented by using an alkaline solution having a low concentration at the start of the reaction, but also the decrease in the raw material concentration of the reaction liquid can be suppressed by using an alkaline solution having a high concentration at the later stage of the reaction so that the reaction efficiency can be increased compared to the reaction in which only an alkaline solution having a low concentration is added. In other words, at the start of the reaction, an alkaline solution having a low concentration is used since starch, in which cross-linking has not yet proceeded, is easily gelatinized by addition of an alkaline solution. On the other hand, when the starch is crosslinked and becomes hardly gelatinized as the reaction proceeds, an alkaline solution having a high concentration can be added. Then, when the concentration of the alkaline solution to be added becomes higher, the amount of the added alkaline solution necessary for maintaining the desired pH condition is reduced, so that the starch concentration of the starch slurry can be kept high, and the efficiency of the phosphoric acid crosslinking reaction can be increased.

Therefore, it is preferable that the alkaline solution is added so that the pH of the reaction liquid is adjusted to the desired range described above and that the starch is not gelatinized. For example, by preliminarily evaluating an upper limit of the concentration of an alkaline solution at which starch is not gelatinized at a planned amount to be added, and adding the alkaline solution having a concentration as high as possible (a concentration of the upper limit or lower), starch having a higher resistant starch content can be efficiently obtained.

The concentration of the alkaline solution to be added may be continuously increased during the reaction, and may be increased stepwise. In order to minimize the decrease in the raw material concentration, as described above, it is preferable to continuously increase the concentration of the alkaline solution so as to keep a concentration as high as possible within a range in which starch is not gelatinized in the starch slurry at the time of the addition. On the other hand, the concentration of the alkaline solution may be increased stepwise, for example, by using alkaline solutions of 2 to 10 types of concentrations. In particular, by increasing the concentration using alkaline solutions having 2 types of concentrations, preparation of the reagent should need less time and labor, and the complication of the facility can be avoided.

Examples of the alkaline solution include an aqueous solution of a hydroxide of an alkali metal, an aqueous solution of a hydroxide of an alkaline earth metal, and an aqueous solution of a carbonate of an alkali metal, and an aqueous NaOH solution (aqueous sodium hydroxide solution) or an aqueous KOH solution (aqueous potassium hydroxide solution) is preferred, and an aqueous NaOH solution is more preferred.

The initial concentration of the alkaline solution to be added (the concentration of the alkaline solution added at the start of the reaction) may be as high as possible within a range in which the starch is not gelatinized, depending on, for example, the starch concentration of the raw starch slurry. For example, when an aqueous NaOH solution is used as the alkaline solution, the initial concentration may be usually 2 to 4% by mass, and may be, for example, 3% by mass.

The final concentration of the alkaline solution to be added may be as high as possible within a range in which the starch is not gelatinized, depending on, for example, the concentration of starch in the raw starch slurry. For example, when an aqueous NaOH solution is used as the alkaline solution, the final concentration may be 1 to 20% by mass, and is preferably 11 to 15% by mass.

When 2 types of aqueous solutions having 2 types of concentrations of NaOH are used as the alkaline solution, an aqueous solution of 2 to 4% by mass of NaOH and an aqueous solution of 11 to 15% by mass of NaOH are preferably used, and an aqueous solution of 3% by mass of NaOH and an aqueous solution of 11 to 13% by mass of NaOH are more preferably used.

The speed at which the concentration of the alkaline solution to be added is continuously increased or the timing at which the concentration of the alkaline solution to be added is changed to a higher concentration may be designed so as to reach a higher concentration as soon as possible within a range in which the starch is not gelatinized.

The confirmation of the range in which the starch is not gelatinized can be performed, for example, by confirming that the starch in the starch slurry has a crystal structure. The presence or absence of the crystal structure can be confirmed by using, for example, a polarizing microscope. By using a polarizing microscope, a characteristic birefringence, called polarizing cross, is observed when the starch has a crystal structure (when the starch is not gelatinized). For example, by a preliminary experiment or the like, a concentration of the alkaline solution at which the crystal structure is lost, or a timing or a rate at which the concentration is increased can be confirmed and based on the concentration or the like, conditions such as concentration and the like in the production method can be designed within a range in which starch is not gelatinized.

(Post-Treatment)

Since the phosphoric acid crosslinking reaction may proceed even after completion of the addition of phosphorus oxychloride, it is preferable to maintain the pH within the aforementioned range even after completion of the addition of phosphorus oxychloride.

Thereafter, the reaction liquid is adjusted to near neutral (pH 4 to 7, preferably pH 6). The adjustment may be carried out by a hydrochloric acid solution (HCl). The time from the start of the addition of phosphorus oxychloride to the addition of HCl varies depending on conditions such as reaction temperature and the like, but may be usually 10 minutes to 4 hours, preferably 30 minutes to 2 hours.

After the end of the reaction, the starch slurry adjusted to pH 4 to 7 is added with water, washed and dehydrated, and then dried to obtain dry phosphoric acid crosslinked starch.

<Phosphoric Acid Crosslinked Starch>

By the production method of the present invention in which the concentration of the alkaline solution to be sequentially added is increased during the progress of the phosphoric acid crosslinking reaction using phosphorus oxychloride, phosphoric acid crosslinked starch having a higher resistant starch content can be obtained at a lower phosphorus content compared with a production method in which the concentration of the alkaline solution is not increased.

The production method of the present invention can be used, for example, to produce phosphoric acid crosslinked starch having a resistant starch content of 60% or more, preferably 80% or more. Further, phosphoric acid crosslinked starch obtained by the production method of the present invention can suppress the phosphorus content to 0.5% or less. Further, phosphoric acid crosslinked starch obtained by the production method of the present invention maintains a high resistant starch content even when heated by cooking or the like.

Phosphoric acid crosslinked starch obtained by the production method of the present invention can be used as a food additive, as having a low phosphorus content. Further, since phosphoric acid crosslinked starch obtained by the production method of the present invention has a high resistant starch content, it can be used as a material for a functional food which enhances the quality of life and improves or prevents disease, similar to dietary fiber. For example, improvement in insulin-responsiveness, improvement in intestinal function, improvement in symptoms relating to fat in the blood and the like can be expected from phosphoric acid crosslinked starch obtained by the production method of the present invention. Phosphoric acid crosslinked starch obtained by the production method of the present invention can be used to replace a part or all of starch, for example, in a food containing starch as a component.

According to a preferred aspect of the present invention, phosphoric acid crosslinked starch obtained by the production method of the present invention is pea-derived phosphoric acid crosslinked starch. As compared with other starch species, pea starch as a raw material has a white color of starch itself, and has almost no peculiar odor such as a grain odor of corn starch, and has an advantage that it does not impair color and flavor of food when used in the food. Phosphoric acid crosslinked starch derived from pea thus has almost no peculiar odor. Therefore, the pea-derived phosphoric acid crosslinked starch is particularly applied to products whose flavor and color are important: noodles typified by udon (a type of noodles) and pastas and the like, breads, cheeses, baked foods such as cakes and the like, Japanese foods such as dango, and dairy products such as yogurt and the like, for example, so that the physiological action peculiar to the resistant starch can be expected.

According to one aspect of the present invention, there is provided pea-derived phosphoric acid crosslinked starch having a resistant starch content of 80% or more and a phosphorus content of 0.5% or less according to the resistant starch measurement method of AOAC official method 2002.02. The pea-derived phosphoric acid crosslinked starch of the present invention has a resistant starch content of preferably 85% or more, more preferably 90% or more, and even more preferably 95% or more according to the resistant starch measurement method of AOAC official method 2002.02, and a phosphorus content of preferably 0.54% or less, more preferably 0.52% or less, still more preferably 0.49% or less, and still more preferably 0.46% or less.

EXAMPLES

The features of the present invention will be described further specifically with reference to Examples and Comparative Examples below. The material, the amount used, the ratio, the treatment, the processing procedure, and the like shown in the following examples can be appropriately changed without departing from the spirit of the present invention. Accordingly, the scope of the present invention should not be construed as being limited by the specific examples shown below.

In the examples, the description "%" indicates "% by mass".

In the examples, the measurement of the resistant starch content (RS content) was performed by a reagent kit (AOAC method 2002 02) manufactured by Megazyme Co., Ltd.

In addition, in the examples, the measurement of the phosphorus content was carried out according to "Acetylated Phosphoric acid crosslinked starch Purity Test (3)" on page 383 of the 9th edition of the Japan's specifications and standards for food additives by the following procedure.

1. About 10 g (M (g) by dry mass) of the sample starch is accurately weighed into a crucible, and added with 10 ml of zinc acetate test solution.

2. The crucible is heated on a hot plate to evaporate the contents to dryness and further heated to carbonize the sample starch.

3. The crucible is then placed in an electric furnace (550° C.) and heated for 1 to 2 hours until the carbide is exhausted.

4. The crucible is removed from the electric furnace, and cooled at room temperature. About 15 mL of distilled water is added to the crucible, and the crucible wall is washed with nitric acid solution (concentrated nitric acid is diluted by 3 times). The crucible is then heated on a hot plate, and the water is brought to a boil.

5. After cooling, the contents in the crucible are transferred to a 200 mL volumetric flask, and made up to 200 mL.

6. Precise volume (VmL) of the obtained solution is measured in a test tube, and is added with distilled water (WmL) to make a 3.5 mL solution. Then, 0.5 mL of nitric acid solution and 0.5 mL of vanadic acid test solution are added and the mixture is stirred.

7. 0.5 mL of ammonium molybdate test solution for processed starch is added to the test tube of "6" of each sample at 30-second intervals, and the mixture is stirred well to develop color, and the obtained solution is used as a sample test solution.

8. Ten minutes after the addition of the ammonium molybdate test solution in "7," the absorbance of the sample test solution is measured in a spectrophotometer (460 nm).

9. 0 mL, 0.5 mL, 1.0 mL, and 1.5 mL of standard potassium phosphate monobasic solution (P=50 ppm) are put in test tubes, respectively, and distilled water is added to each test tube to make up to a total of 3.5 mL.

10. Similar to the sample starch, the absorbance is measured by performing the procedure of "6" and thereafter, and a calibration curve of the phosphorus concentration and absorbance is obtained.

11. The phosphorus concentration in the sample test solution is determined from the calibration curve, and the phosphorus content in starch is calculated from the following formula.

Phosphorus content (%)=Phosphorus concentration in the sample test solution(mg/mL)×100 test solution V(mL)×sample starch dry weight M(g)

<Phosphoric Acid Crosslinking Reaction of Pea Starch Using Sodium Trimetaphosphate>

Pea Starch (manufactured by PURIS) of the dry mass described in Table 1 was dissolved in distilled water in a 2 L beaker to prepare slurry of the raw starch concentration described in Table 1. The beaker was placed in a constant temperature water bath and kept at 40° C. It was maintained at 40±1° C. also during the reaction. To the slurry, saline (sodium chloride) was added in an amount of 1.0% by mass based on the dry mass of the Pea Starch, and then calcium chloride 2 hydrate was added in an amount of 0.2% by mass based on the dry mass of the Pea Starch. Thereafter, a 3% NaOH aqueous solution was added to the slurry to adjust the slurry to pH 11.5. Moreover, the slurry was maintained at pH 11.5±0.3 by addition of 3% NaOH aqueous solution even during the reaction. Addition of sodium trimetaphosphate was conducted at % by mass described in Table 1 with respect to the dry material starch mass, and the reaction was started while the slurry was stirred at 400 rpm. Six hours after the start of the addition of sodium trimetaphosphate, 7% HCl was added to the slurry to make the slurry to have pH 6.0±0.1. Thereafter, the slurry was washed, dehydrated and dried.

The RS content and phosphorus content of the obtained phosphoric acid crosslinked starch are shown in Table 1.

In Table 2, "slurry concentration after reaction" is the concentration of the starch in the slurry immediately before the addition of 7% HCl to the slurry.

TABLE 2

| No. | Addition of Sodium trimetaphosphate (%) | Raw starch slurry concentration (w/w %) | Raw starch amount (dry mass g) | Amount of 3% NaOH used (g) | Slurry concentration after reaction (w/w %) | RS content AOAC 2002.02 (dry mass %) | Phosphorus content (%) |
|---|---|---|---|---|---|---|---|
| — | 0 | — | — | — | — | 14.1 | 0.01 |
| 1 | 10 | 35 | 300 | not measured | — | 22.2 | 0.17 |
| 2 | 15 | 35 | 300 | 301 | 25.9 | 46.2 | 0.60 |
| 3 | 20 | 35 | 300 | 331 | 25.3 | 58.5 | 0.73 |
| 5 | 25 | 35 | 300 | 216 | 28.0 | 86.7 | 0.81 |
| 6 | 12 | 41 | 200 | 143 | 31.7 | 40.4 | 0.44 |

<Phosphoric Acid Crosslinking Reaction of Pea Starch Using Phosphorus Oxychloride>

Pea Starch (manufactured by PURIS) of the dry mass described in Table 2 was dissolved in distilled water in a 2 L beaker to prepare slurry of the raw starch concentration described in Table 2. The beaker was placed in a constant temperature water bath and kept at 35° C. It was maintained at 35±1° C. also during the reaction. A 3% NaOH aqueous solution was added to the slurry to adjust the slurry to pH11.0 and maintained for 30 minutes. Phosphorus oxychloride was added to the slurry to initiate the reaction while the slurry was stirred at 400 rpm, and phosphorus oxychloride of % by mass as described in Table 2 with respect to the mass of dry raw starch in a total amount was added sequentially to the starch slurry using a glass pipette over a period of 1 hours to 1 hours and a half. During the reaction, a pH controller (NPHT-10) manufactured by Nisshin Rika Co., Ltd. was used, and a 3% NaOH aqueous solution or a 3% NaOH aqueous solution followed by a 12% NaOH aqueous solution was added sequentially using a tube pump manufactured by Tokyo Rikakikai Co., Ltd. (MP-3), so that the slurry was maintained at a pH11.0±0.3. To maintain the slurry at pH11.0±0.3 even after completion of the addition of phosphorus oxychloride, 12% NaOH aqueous solution (3% NaOH aqueous solution in sample No. 7 to 9) was added sequentially, and the slurry was stirred. The amounts of the 3% NaOH aqueous solution used and the 12% NaOH aqueous solution used were as shown in Table 2. 30 minutes after completion of the addition of phosphorus oxychloride, 7% HCl was added to the slurry to make the slurry to have pH 6.0±0.1. Thereafter, the slurry was washed, dehydrated and dried.

The RS content and phosphorus content of the obtained phosphoric acid crosslinked starch are shown in Table 3.

In Table 3, "slurry concentration after reaction" is the concentration of the starch in the slurry immediately before the addition of 7% HCl to the slurry.

TABLE 3

| No. | Addition of phosphorus oxychloride (%) | Raw starch slurry concentration (w/w %) | Raw starch amount (dry mass g) | Amount of 3% NaOH used (g) | Amount of 12% NaOH used (g) | Slurry concentration after reaction (w/w %) | RS content AOAC 2002.02 (dry mass %) | Phosphorus content (%) |
|---|---|---|---|---|---|---|---|---|
| — | 0 | — | — | — | — | — | 14.1 | 0.01 |
| 7 | 8 | 35 | 300 | 1071 | 0 | 15.6 | 20.3 | 0.09 |
| 8 | 12 | 35 | 300 | 1570 | 0 | 12.4 | 25.3 | 0.18 |
| 9 | 16 | 35 | 200 | 1450 | 0 | 9.9 | 31.9 | 0.23 |
| 10 | 16 | 41 | 200 | 323 | 280 | 18.3 | 83.6 | 0.46 |
| 11 | 18 | 41 | 200 | 318 | 323 | 17.7 | 95.1 | 0.49 |
| 12 | 20 | 41 | 200 | 316 | 370 | 17.0 | 91.9 | 0.52 |

A heat test at 105° C. for 30 minutes was performed on pea starch which was phosphoric acid-crosslinked by using phosphorus oxychloride in the same manner as described above (No. 11). Assuming a condition such as the condition in cooking, the test was conducted on samples with or without addition of 10% of water with respect to the amount of the starch. In the sample with addition of 10% of water, water was added 10% by mass with respect to the starch, and mixing was conducted with stirring using an FM mixer (manufactured by Henschel Co.) for 10 minutes. Results are shown in Table 4.

TABLE 4

| | RS content |
|---|---|
| Before heated | 91.7% |
| Heated without addition of water | 94.2% |
| Heated after addition of 10% water and stirring | 82.0% |

From the results shown in Table 4, it can be understood that phosphoric acid crosslinked starch obtained by the production method of the present invention maintains an RS content of 80% or more even when heated in cooking or the like.

The invention claimed is:

1. A method of producing phosphoric acid crosslinked starch, comprising:
   adding phosphorus oxychloride sequentially to raw starch slurry under a condition of pH 9 to 12, to cause the raw starch to undergo a phosphoric acid crosslinking reaction, and
   controlling the pH by sequentially adding an alkaline solution,
   wherein concentration of the alkaline solution is increased stepwise or continuously between start and end of the phosphoric acid crosslinking reaction,
   concentration of the raw starch in the raw starch slurry is 30 to 45% by mass, total mass of the phosphorus oxychloride added is 12% by mass or more based on dry mass of the raw starch, and concentration of the starch in the reaction liquid at the end of the reaction is 15% by mass or more,
   the alkaline solution is an aqueous NaOH solution, and concentration of the aqueous NaOH solution is increased from 2 to 4% by mass to 11 to 20% by mass from the start of the reaction to the end of the reaction.

2. The production method according to claim 1, wherein the total mass of the phosphorus oxychloride added is 14 to 20% by mass based on the dry mass of the raw starch.

3. The production method according to claim 1, wherein ratio of mass of the reaction liquid at the end of the reaction to mass of the raw starch slurry is 2.5 or less.

4. The production method according to claim 1, wherein the aqueous NaOH solution comprises 2 types including a solution having a concentration of 2 to 4% by mass and a solution having a concentration of 11 to 13% by mass.

5. The production method according to claim 1, wherein a resistant starch content according to a resistant starch measuring method of AOAC official method 2002.02 of the raw starch is 20% or less.

6. The production method according to claim 1, wherein an amylose content of the raw starch is less than 40% by mass.

7. The production method according to claim 1, wherein the raw starch is pea starch.

8. The production method according to claim 1, wherein a resistant starch content of the phosphoric acid crosslinked starch according to a resistant starch measurement method of AOAC official method 2002.02 is 60% or more.

9. The production method according to claim 1, wherein the reaction liquid after the end of the phosphoric acid crosslinking reaction is adjusted to pH 4 to 7 with an acidic solution.

10. The production method according to claim 9, wherein concentration of the starch in the reaction liquid immediately before the acidic solution is added is 15% by mass or more.

11. The production method according to claim 9, wherein concentration of the alkaline solution is increased stepwise or continuously between the start of the addition of the phosphorus oxychloride and the time at which the acidic solution is added.

12. The production method according to claim 4, wherein the reaction liquid after the end of the phosphoric acid crosslinking reaction is adjusted to pH 4 to 7 with an acidic solution.

13. The production method according to claim 12, wherein concentration of the starch in the reaction liquid immediately before the acidic solution is added is 15% by mass or more.

14. The production method according to claim 12, wherein concentration of the alkaline solution is increased stepwise between the start of the addition of the phosphorus oxychloride and the time at which the acidic solution is added.

* * * * *